US008231090B2

(12) United States Patent
Cramer

(10) Patent No.: US 8,231,090 B2
(45) Date of Patent: Jul. 31, 2012

(54) APPARATUS FOR MOUNTING A WHEELCHAIR AMPUTEE PAD

(75) Inventor: David Cramer, Hartford, WI (US)

(73) Assignee: The Comfort Companies, Inc., Bozeman, MT (US)

( * ) Notice: Subject to any disclaimer, the term of this patent is extended or adjusted under 35 U.S.C. 154(b) by 211 days.

(21) Appl. No.: 11/857,287

(22) Filed: Sep. 18, 2007

(65) Prior Publication Data

US 2009/0072103 A1 Mar. 19, 2009

(51) Int. Cl.

| | |
|---|---|
| ***A47B 96/06*** | (2006.01) |
| ***E04G 3/00*** | (2006.01) |
| ***F16B 1/00*** | (2006.01) |
| ***G09F 7/18*** | (2006.01) |

(52) U.S. Cl. .............. 248/229.14; 248/218.4; 297/423.1

(58) Field of Classification Search ............... 248/229.1, 248/229.13, 229.14, 230.4, 230.5, 291.1, 248/292.12, 218.4; 297/DIG. 4, 411.23, 297/411.26, 411.27, 423.1

See application file for complete search history.

(56) References Cited

U.S. PATENT DOCUMENTS

| | | | | |
|---|---|---|---|---|
| 3,453,027 | A * | 7/1969 | Pivacek | 297/423.37 |
| 3,854,774 | A * | 12/1974 | Limpach | 297/423.37 |
| 4,458,870 | A * | 7/1984 | Duncan et al. | 248/279.1 |
| 4,988,114 | A * | 1/1991 | Thornton et al. | 280/304.1 |
| 5,246,240 | A * | 9/1993 | Romich et al. | 280/304.1 |
| 5,401,045 | A * | 3/1995 | Foerster et al. | 280/250.1 |
| 5,703,306 | A * | 12/1997 | Liao | 84/421 |
| 6,209,835 | B1 * | 4/2001 | Walrath et al. | 248/276.1 |
| 6,234,576 | B1 * | 5/2001 | Fleigle | 297/423.37 |
| 6,254,116 | B1 * | 7/2001 | Szumlic et al. | 280/304.1 |
| 7,104,610 | B2 * | 9/2006 | Cramer | 297/440.2 |
| 7,427,078 | B1 * | 9/2008 | Humble et al. | 280/304.1 |

* cited by examiner

*Primary Examiner* — Nkeisha Smith

(74) *Attorney, Agent, or Firm* — Joseph S. Heino; Patrick M. Bergin

(57) ABSTRACT

The apparatus for mounting a wheelchair pad provides a high degree of support and adjustability such that it can be used with wheelchairs from a wide variety of different manufacturers. This adjustability is also beneficial to the occupant of the wheelchair, as the adjustability can provide a wide variety of people with a more custom fit. In order to provide this custom fit, the claimed invention provides for depth adjustability, height adjustability and angle adjustability in both the vertical and horizontal planes of the amputee pad. Additionally the claimed invention can be installed on either side of the wheelchair.

11 Claims, 14 Drawing Sheets

APPARATUS FOR MOUNTING A WHEELCHAIR AMPUTEE PAD

FIELD OF THE INVENTION

The present invention relates generally to wheelchairs and more specifically to adjustable wheelchair attachments. More specifically, the present invention relates to an apparatus for mounting a wheelchair amputee pad to the leg rests of a wheelchair that provides infinite adjustability in three dimensions.

BACKGROUND OF THE INVENTION

People requiring wheelchairs include those affected with amputations, cerebral palsy, muscular dystrophy, multiple sclerosis, and head injuries, among other debilitating physical conditions. These individuals often suffer from edema (pooling of fluid in areas of poor vascular flow), sensitive scar tissue and other surgical ailments. One of the most common complaints of wheelchair occupants is that of pain that is directly related to their use of a wheelchair. Unfortunately, at least some of the problems faced by wheelchair users are further exacerbated by the failure of current designs of wheelchair amputee pads and amputee pad systems to properly position a wheelchair occupant.

Another disadvantage of current wheelchair amputee systems is that they provide limited adjustability for people of different sizes, shapes and physical needs. For example, current amputee systems known to the inventor allow for almost no accommodation for the user's size. As the body gets wider, the amputated leg often gets wider, requiring a larger pad. An additional problem is that amputee patients often have a below the knee or above the knee amputation and current systems do not accommodate for this difference in stump length.

Edema in the amputated stump is another serious problem and is not addressed by the current design. Some wheelchair amputee supports provide limited adjustability, e.g. the wheelchair amputee pad can move vertically but has no depth adjustability, or the wheelchair amputee pad can move vertically but has no angle adjustability in the vertical or horizontal plane.

A common problem with current wheelchair amputee systems is the variability between commercially available wheelchairs. In particular, the leg rest tubes of the wheelchair often differ in configuration between wheelchairs. Specifically, in the inventor's experience, the diameter of the tubes may vary from between ¾" to 1¼". Additionally, while there are hangers for mounting standard leg rests, these hangers vary between manufacturers. Currently, a facility has to order a specific amputee system for a specific wheelchair. That is, current OEM manufacturers make specific amputee systems for specific wheelchairs. With the wide variety of wheelchairs and amputee systems available, it is prohibitively expensive to stock amputee systems for each and every wheelchair available. Further, there is no such thing as a "one size fits all" wheelchair. Wheelchairs and accessories therefor, such as the claimed invention, must be fit to each individual.

An additional problem with current wheelchair amputee systems is that they are not adaptable to all wheelchairs. For example, some wheelchairs, particularly those designed for more active lifestyles, have shorter leg rest tubes. More typical designs, such as those intended for nursing homes and hospitals, have longer leg rest tubes. Further complicating the matter is the fact that different manufacturers use different configurations for the leg rest tube. In addition, the users' cushion can vary in thickness, requiring the amputee pad to be height adjustable.

Accordingly, what is required is an amputee mounting apparatus and system that can be fitted to the user while the user is seated in the wheelchair. Such a device will reduce the number of transfers during such a fitting. This reduces the chances of falling, tearing of skin, bruising and other injuries associated with wheelchair transfers. This also expedites the fitting process, which allows the therapist to spend more time fine tuning the fit.

Therefore, what is needed is a wheelchair amputee mounting apparatus and system that is adaptable to wheelchairs having leg rests, having a wide variety of different diameters and leg rest hanger configurations. There is also a need to provide a wheelchair amputee mounting device and system that provides a wide variety of adjustability so that it can fit all shapes and sizes of people. Lastly, there is a need to provide a wheelchair amputee support that is quickly and easily removable such that it can be removed, and the wheelchair collapsed and stored.

SUMMARY OF THE INVENTION

The claimed invention provides an apparatus for mounting a wheelchair amputee that provides a high degree of support and adjustability such that it can be used with wheelchairs from a wide variety of different manufacturers. This adjustability is also beneficial to the occupant of the wheelchair, as the adjustability can provide a wide variety of people with a more custom fit. In order to provide this custom fit, the claimed invention provides for depth adjustability, height adjustability and angle adjustability in both the vertical and horizontal planes of the amputee pad.

The claimed invention also provides the convenience of a quick-release wheelchair amputee support so that the wheelchair occupant can easily remove the amputee support from the wheelchair so that the wheelchair can be collapsed and stored.

The claimed mounting device and system also provides for an effective single point mounting system. Therefore, the mounting device of the present invention provides a high degree of adjustability with respect to the angle that it can be inclined or declined with respect to prior systems. Additionally, use of a single point mounting system is particularly important with wheelchairs having short leg rests and other designs as it allows for a single assembly to fit the majority of all wheelchair styles.

The foregoing and other features of the device and system of the present invention will be apparent from the description that follows.

DETAILED DESCRIPTION

Figure 9:
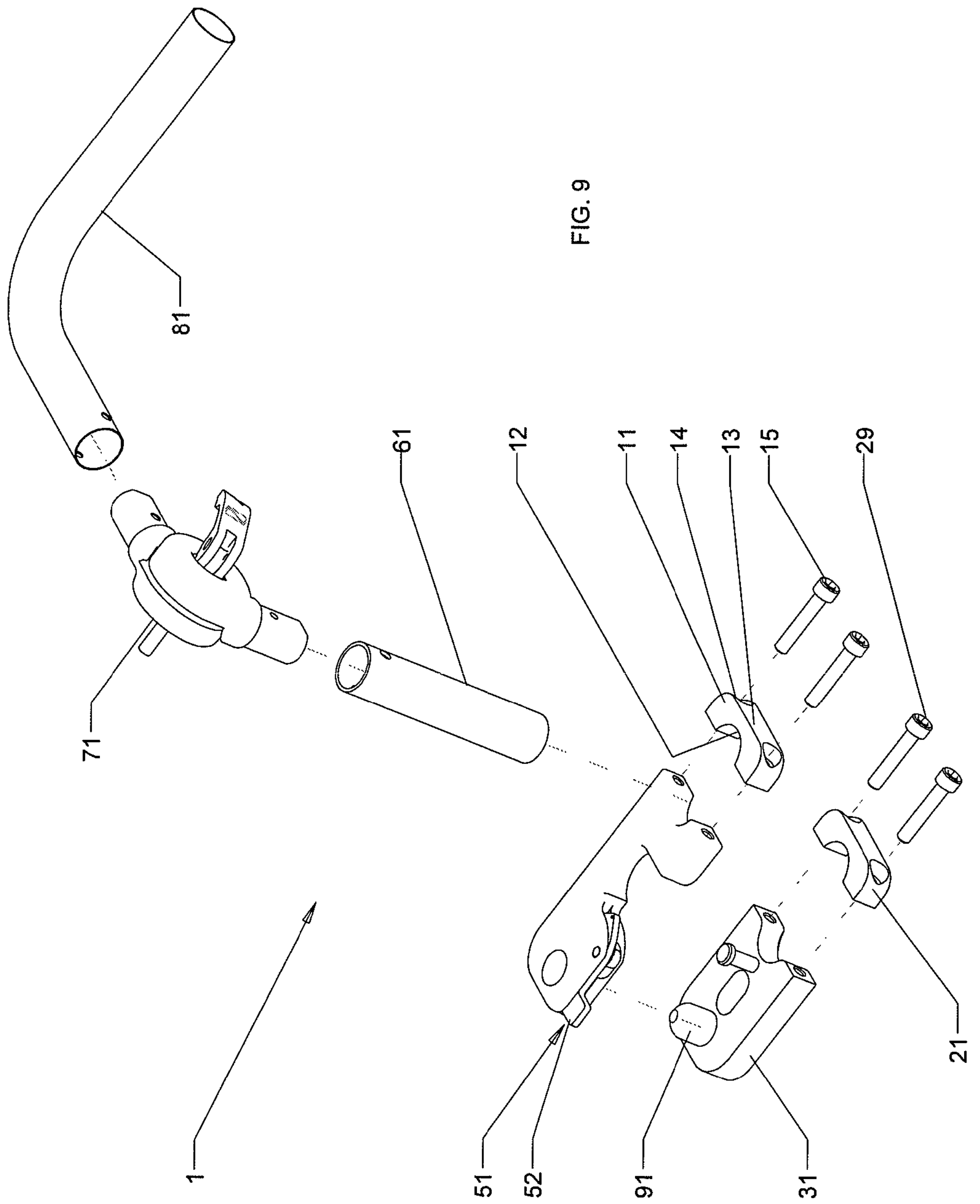
FIG. 9 is an exploded view of the amputee support designed for use with a wheelchair together with the mounting device of the claimed invention.
Figure 10:
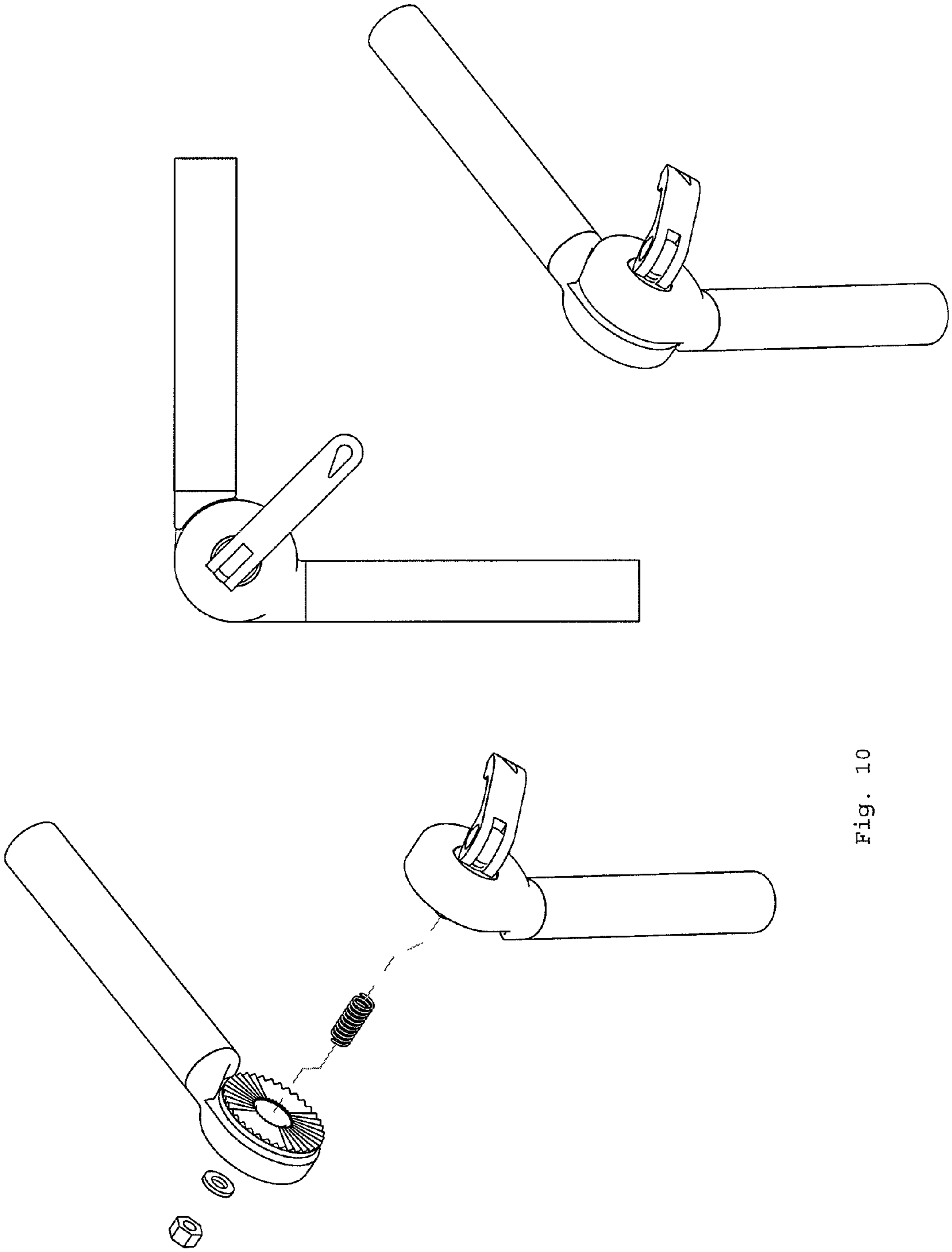
FIG. 10 is an exploded perspective view of the angle adjustment bracket.
Figure 11:
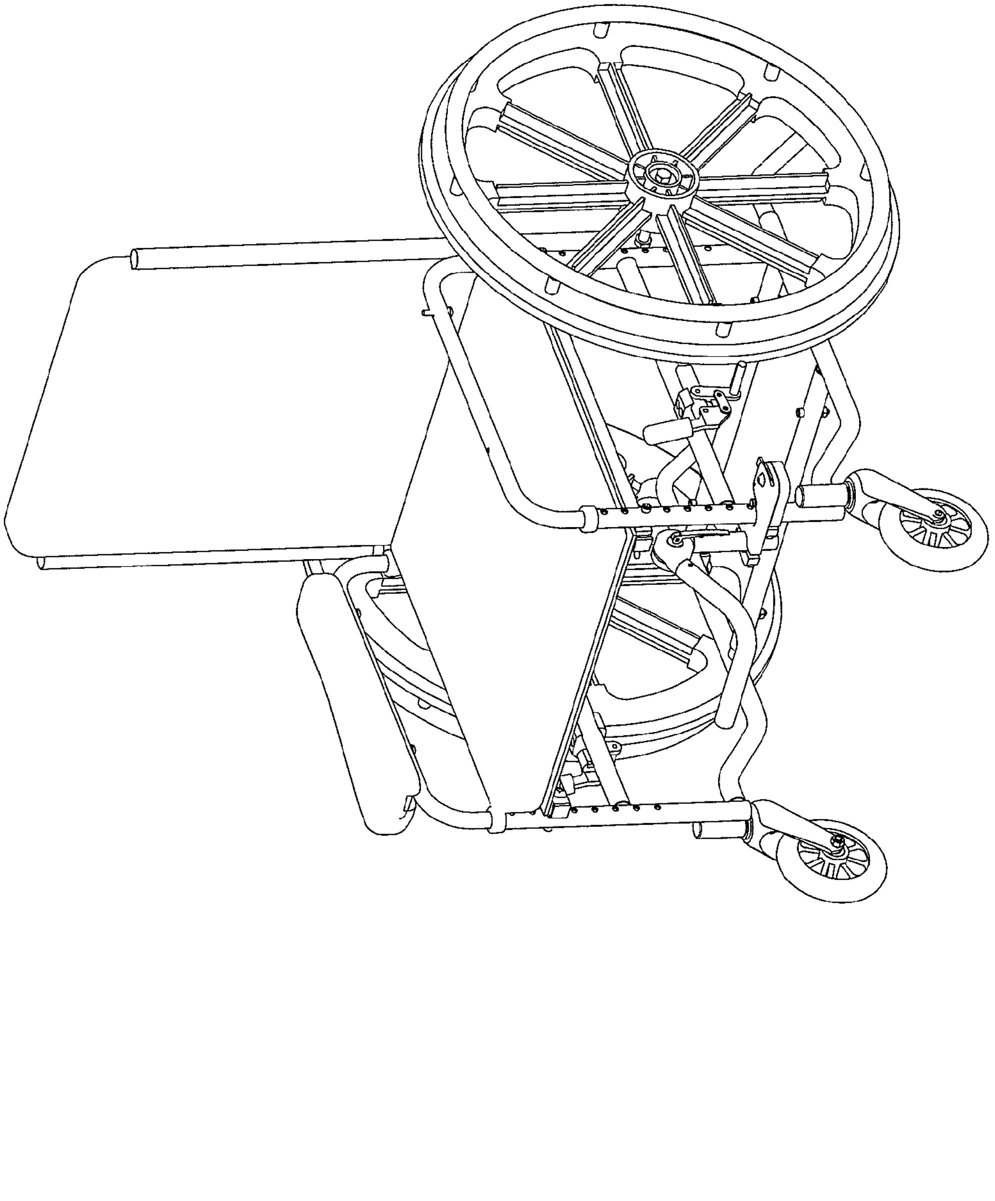
FIG. 11 is a perspective view of the amputee support attached to the wheelchair showing the amputee pad support arm in a lowered position.
Figure 12:
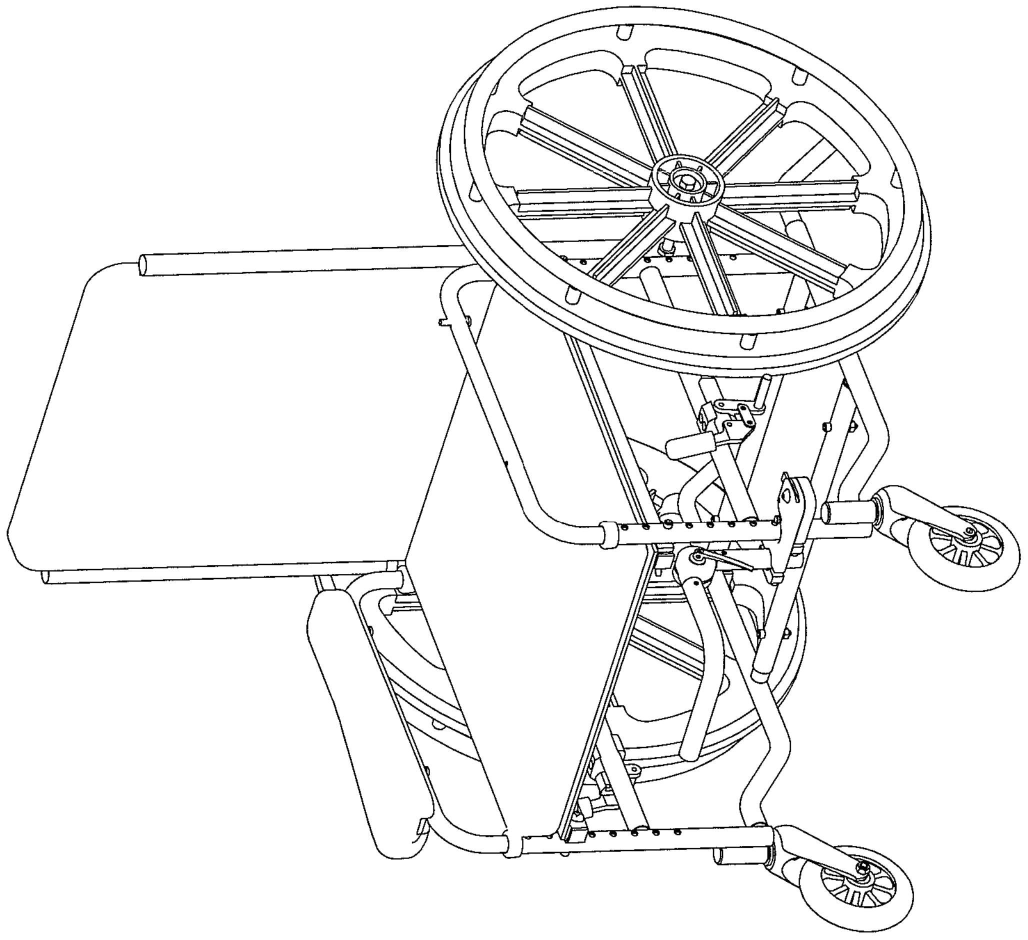
FIG. 12 is a perspective view of the amputee support attached to the wheelchair showing the amputee pad support arm in a nearly horizontal position.
Figure 13:
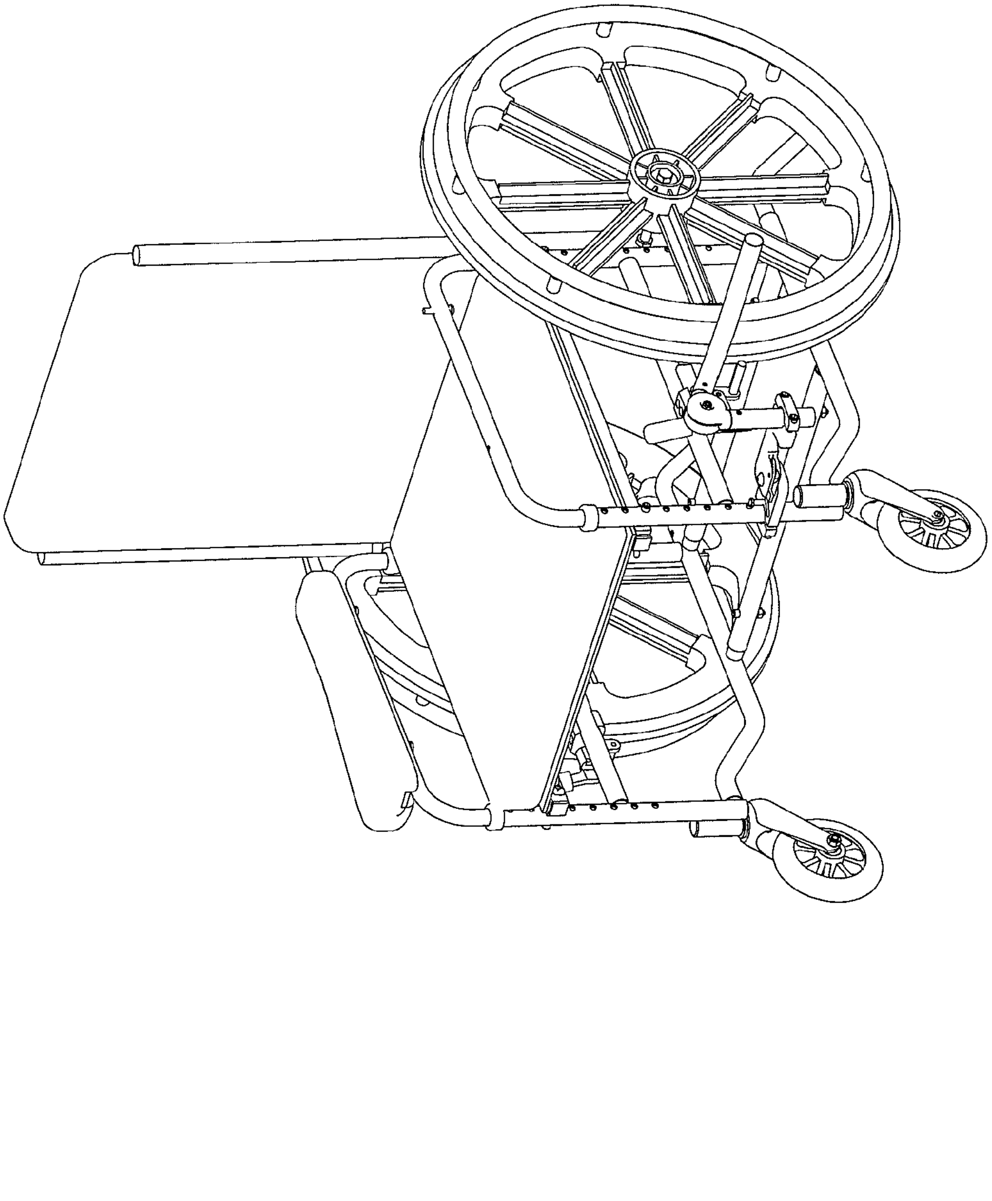
FIG. 13 is a perspective view of the amputee support attached to the wheelchair showing the swing away function of the amputee support.
Figure 14:
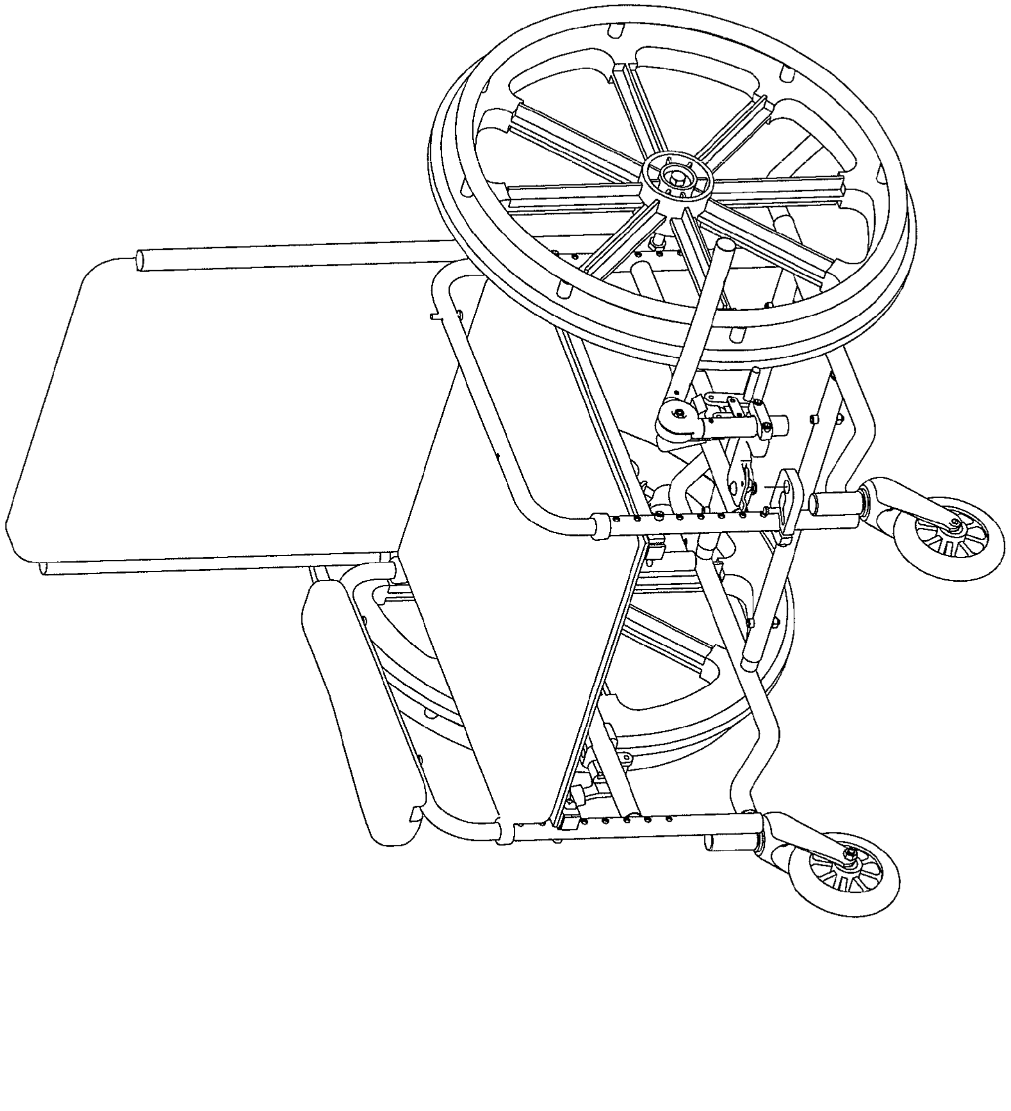
FIG. 14 is a perspective view of the amputee support attached to the wheelchair showing how the swing away portion of the amputee support can be removed from a wheelchair.

Now referring to the drawings in detail, wherein like numbers are assigned to like elements throughout, FIG. 9 shows an exploded view of the amputee support assembly 1. The amputee support assembly is generally comprised of wheelchair bottom bracket 31, which is attached to a wheelchair leg support (not shown) by a cane clamp 21, a swing arm 41, vertical adjustment post 61, angle adjustment means 71 and amputee pad support arm 81.

Figure 1C:
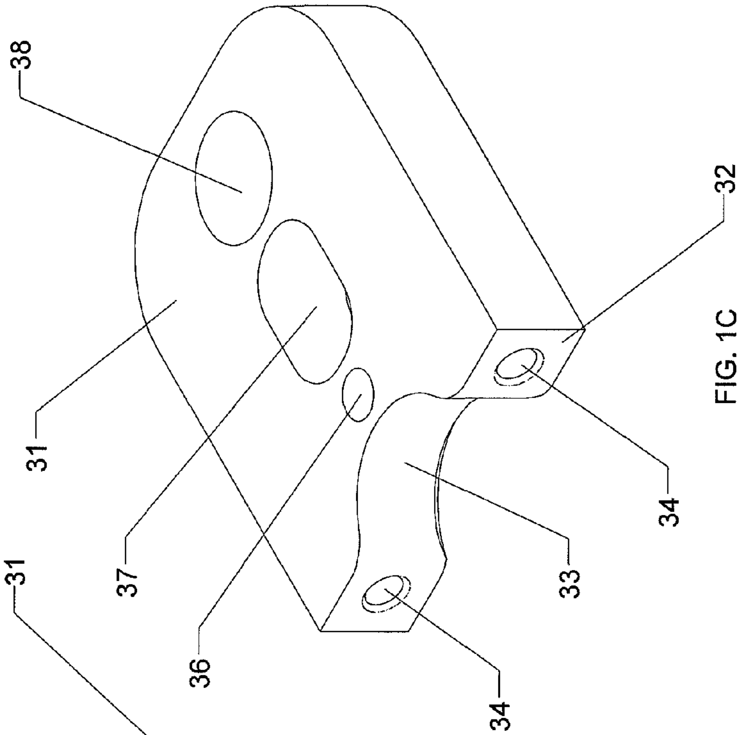
FIG. 1C is a top and side perspective view of the bottom wheelchair leg rest clamp.
Figure 1B:
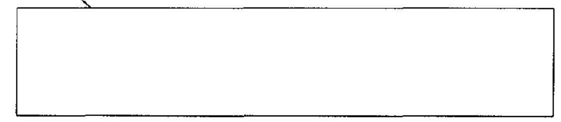
FIG. 1B is a side elevation view of the bottom wheelchair leg rest clamp.
Figure 1A:
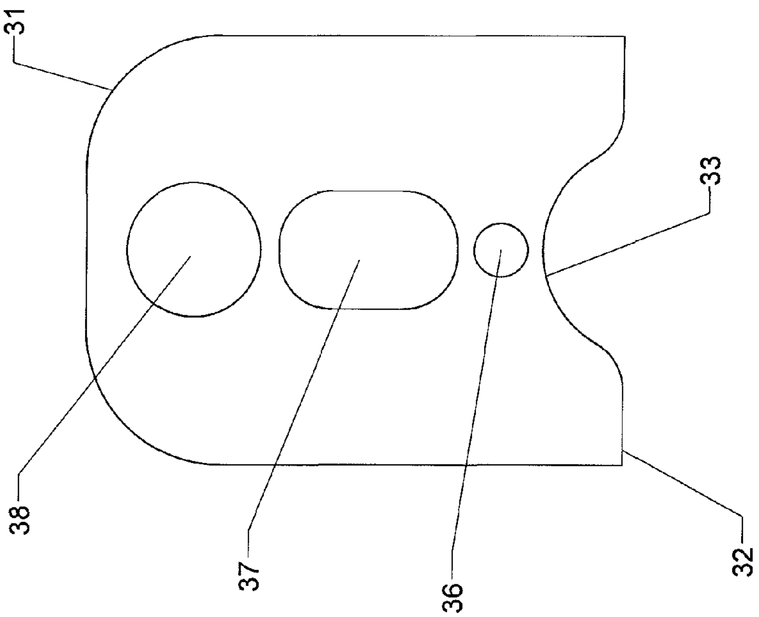
FIG. 1A is a top or bottom plan view of the bottom wheelchair leg rest clamp.
Figure 2A:
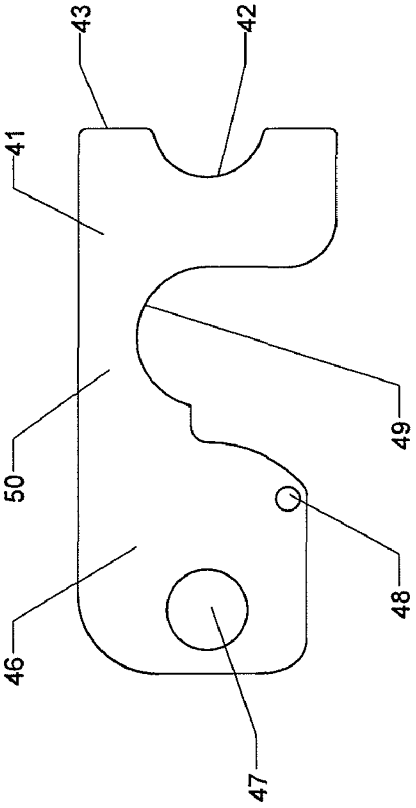
FIG. 2A is a top or bottom plan view of the amputee swing arm.
Figure 2B:
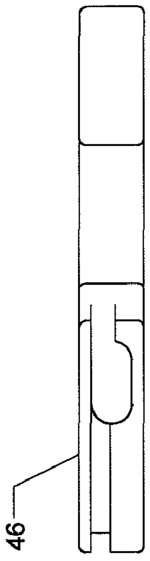
FIG. 2B is a side elevation view of the amputee swing arm.
Figure 2C:
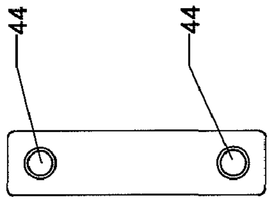
FIG. 2C is an end elevational view of the amputee swing arm.
Figure 2D:
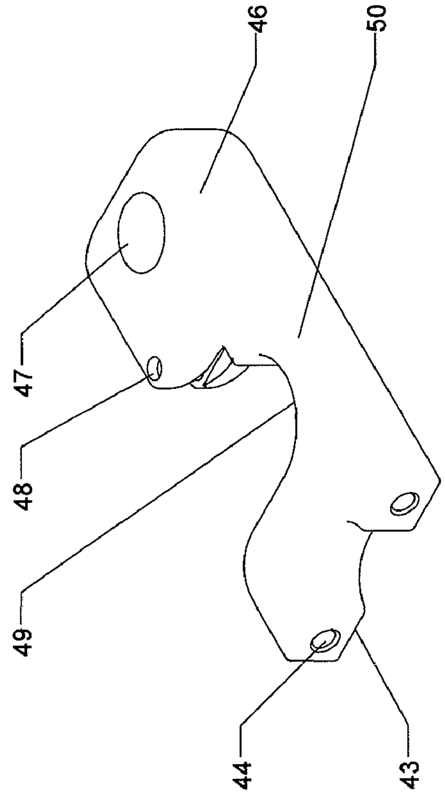
FIG. 2D is a top and side perspective view of the amputee swing arm.
Figure 3C:
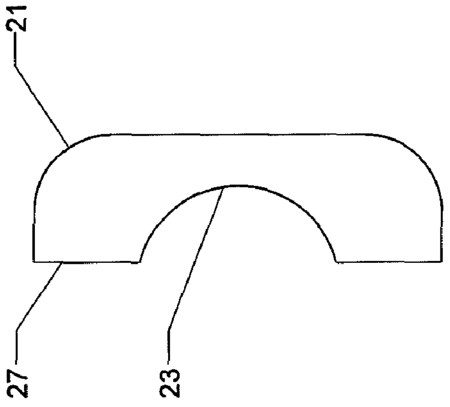
FIG. 3C is a side elevational view of the wheelchair leg rest clamp.
Figure 3B:
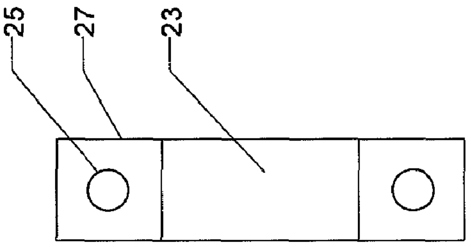
FIG. 3B is a bottom plan view of the wheelchair leg rest clamp
Figure 3A:
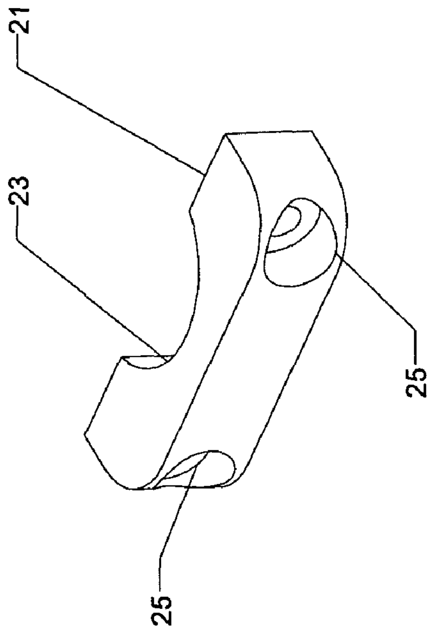
FIG. 3A is a top and side perspective view of the wheelchair leg rest clamp.

Shown in more detail in FIG. 1, the wheelchair bottom bracket 31 is attached to the wheelchair leg support (not shown) by a wheelchair cane clamp 21, which is shown in detail in FIG. 3. The wheelchair cane clamp 21 provides an arcuate inner surface 23, and outer surface 27 having at least two passages 25 therethrough, the wheelchair cane clamp having passages 25 on each side of the arcuate inner surface 23.

The wheelchair bottom bracket 31 has a corresponding arcuate inner surface 33 and a surface to each side 32 of the arcuate inner surface 33, the surfaces 32 each containing a threaded aperture 34. In operation, the wheelchair bottom bracket 31 is attached to the wheelchair support via screws 29 through the passages 25 in the wheelchair cane clamp 21, the screws being used to secure the wheelchair cane clamp 21 to the wheelchair bottom bracket 31 around a wheelchair leg support.

The wheelchair bottom bracket 31 further comprises a longitudinally extending portion having a keeper post aperture 36 closest to the arcuate edge 33 of the wheelchair bottom bracket 31. Moving further away from the arcuate edge 33 of the wheelchair bottom bracket 31 is a hangar slot 37. The hangar slot 37 is designed to accommodate those various wheelchairs that already have leg rest hangers that may interfere with free rotation of the claimed invention. Moving still further away from the arcuate edge 33 is the swing-away post aperture 38.

Importantly, the wheelchair bottom bracket 31 is relatively low in profile and can therefore fit on wheelchairs with relatively little vertical space on the wheelchair support. Additionally, the wheelchair bottom bracket 31 is ambidextrous, i.e., it will work on either the left side or the right side, thereby increasing the possibility that a given facility can stock and reuse the same device with a different user.

Figure 4A:
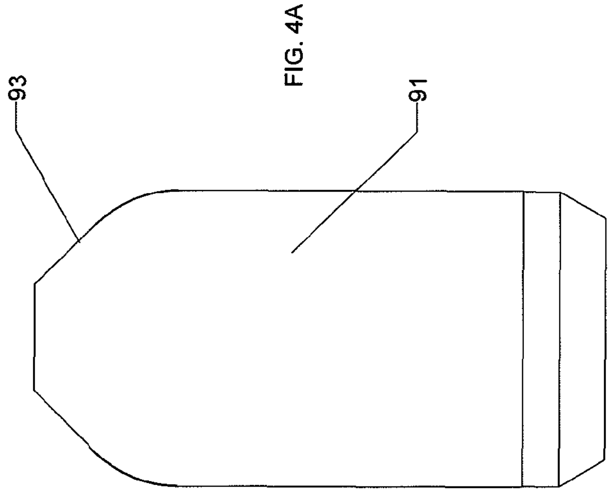
FIG. 4A is a side elevational view of the swing post.
Figure 4B:
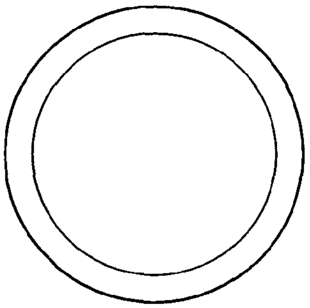
FIG. 4B is a bottom plan view of the swing post.
Figure 5A:
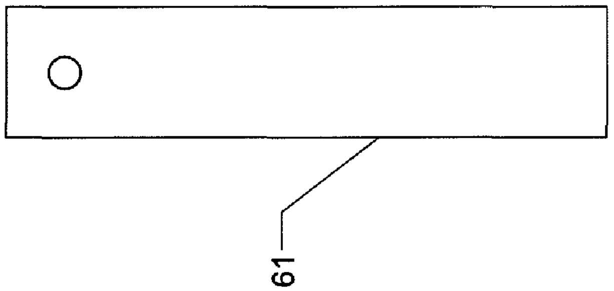
FIG. 5A is a side elevational view of the amputee vertical adjustment post.
Figure 5B:
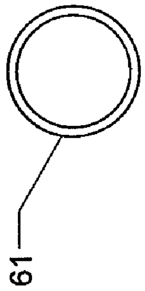
FIG. 5B is a bottom view of the amputee vertical adjustment post.
Figure 7B:
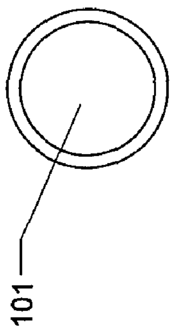
FIG. 7B is top plan view of the amputee keeper post.
Figure 7A:
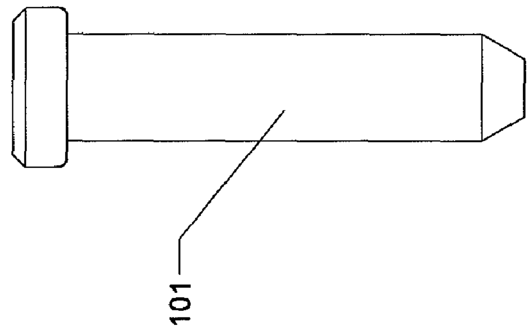
FIG. 7A is a side elevational view of the amputee keeper post.
Figure 8C:
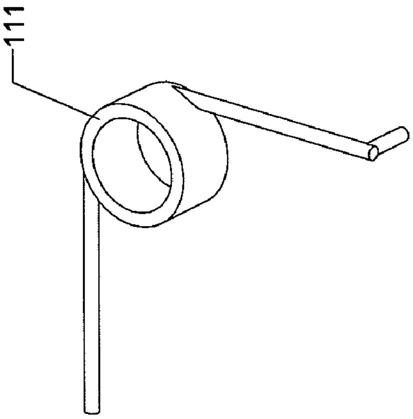
FIG. 8C is a top and side elevational view of the torsion spring.
Figure 8B:
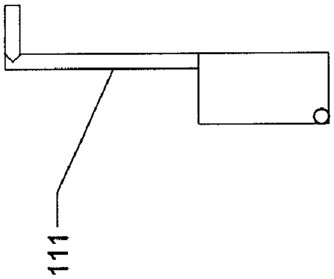
FIG. 8B is side elevational view of the amputee torsion spring.
Figure 8A:
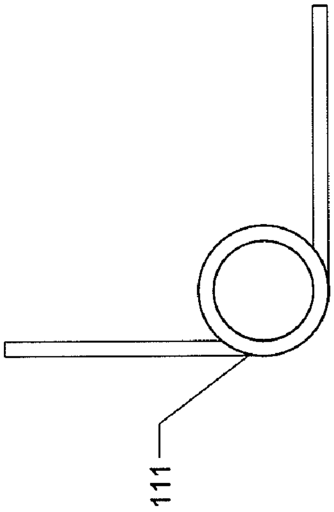
FIG. 8A is a top plan view of the amputee torsion spring.

FIGS. 4A and 4B show the swing-away post 91. The swing-way post 91 is press fit into the swing-away post aperture 38 in the wheelchair bottom bracket 31. The swing-away post 91 has a tapered top 93 such that it fits more easily into the aperture 47 in the swing arm 41, as discussed below. FIGS. 7A and 7B show the keeper post 101 which is press fit into the keeper aperture 36 in the wheelchair bottom bracket 31.

FIGS. 2A through 2D show the swing arm 41 in detail. The swing arm 41 has a first end portion having an arcuate edge 42 and a surface 43 on each side of the arcuate edge 42. Each surface 43 contains a threaded aperture 44. The swing arm 41 is attached to the vertical adjustment post 61 by a swing arm clamp 11. The swing arm clamp 11 is similar or identical in design to the wheelchair cane clamp 21. That is, the swing arm clamp 11 has an arcuate inner surface 12, an outer surface 13 on each side of the arcuate surface 12 and an aperture 14 through each of the outer surfaces 13. Screws 15 are then used to attach the swing arm clamp 11 to the threaded apertures 44 in the swing arm clamp 41. The swing arm clamp 11 is used to secure the vertical adjustment post 61 to the swing arm 41.

As a simple clamping means is used, the vertical adjustment post 61 allows the amputee mechanism to have height adjustment, which is important for wheelchair users because wheelchairs have different designs and wheelchair users require cushions that are of different thicknesses.

Using a wheelchair cane clamp 21 to secure the vertical adjustment post 61 permits also permits adjustments for users with rotated hips, that is, their amputee stump is not aligned with the wheelchair. This clamped connection allows the amputee pad to be rotated in the horizontal plane to allow the pad to align with a user's stump. This connection serves another important task. That is, the amputee support protrudes off the front of the wheelchair. If the amputee support runs into a door frame or other immovable object, this connection will simply rotate as opposed to being damaged by the impact.

Figure 6C:
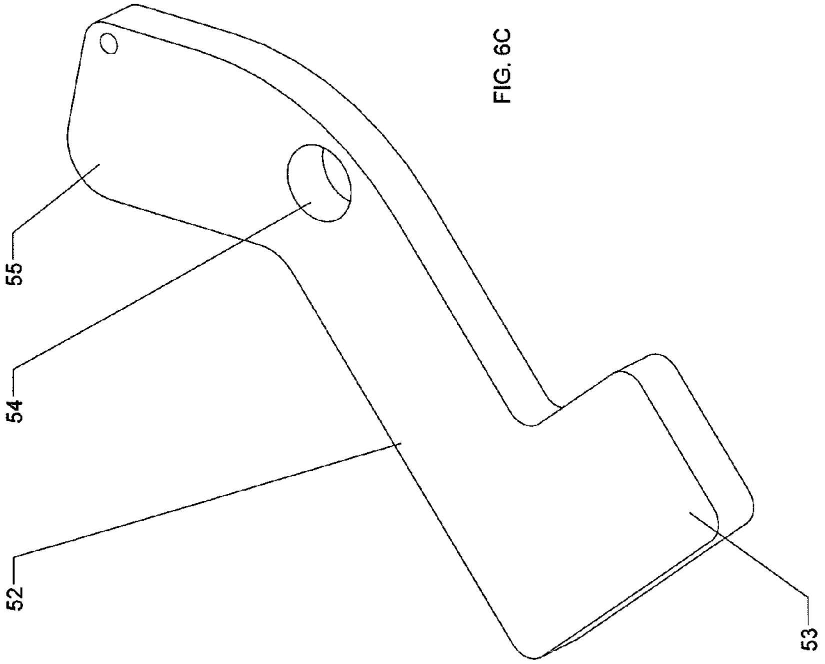
FIG. 6C is a top and side perspective view of the amputee keeper.
Figure 6A:
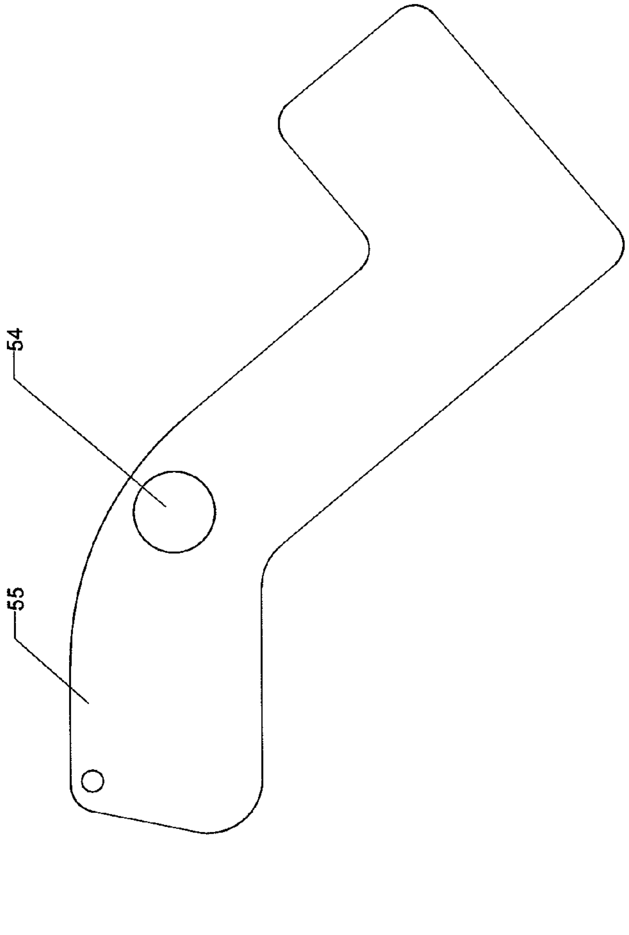
FIG. 6A is a top or bottom plan view of the amputee keeper.
Figure 6B:
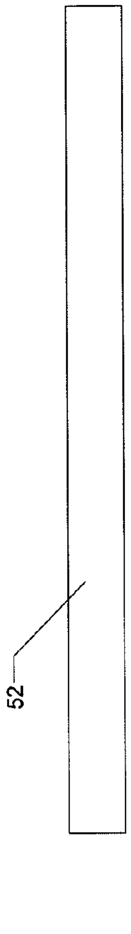
FIG. 6B is a side elevational view of the amputee keeper.

The second end portion 46 of the swing arm 41 has an aperture 47 designed to accommodate the swing-away post 91. The swing arm 41 further comprises a spring loaded keeper mechanism, generally identified 51. The keeper mechanism 51 comprises a keeper arm 52, shown in more detail in FIGS. 6A through 6C. The keeper arm 52 further comprises a pivot aperture 54, a catch arm 55 and a handle arm 53. The keeper arm 52 is secured via a torsion spring 111 secured in the pivot aperture 54 by a fastener (not shown) through an additional aperture 48 in the swing arm 41.

When the swing arm 41 is secured, spatially, it is located on top of the wheelchair bottom bracket 31. As the wheelchair bottom bracket 31 is secured to the wheelchair leg rest cane (not shown), the swing arm 41 accommodates the leg rest cane by providing a middle portion 50 of the swing arm 41 that contains a semicircular indentation 49 in which to accommodate the wheelchair leg rest cane. See FIG. 2A.

As with the wheelchair bottom bracket 31, the swing arm 41 is relatively low in profile and can therefore fit on wheelchairs within a relatively small vertical space on the wheelchair support. Additionally, the swing arm 41 is ambidextrous, i.e., it will work on either the left side or the right side, thereby increasing the possibility that a given facility can stock and reuse the same device with a different user.

The claimed invention provides a keeper arm 52 to secure the swing arm in place relative to the wheelchair bottom bracket 31. See FIGS. 6A through 6C. The keeper arm 52 is biased by the torsion spring 111 to exert pressure on the catch arm 55 end of the keeper arm 52, thereby capturing the keeper post 101 when the swing arm is rotated in that direction and locking the swing arm 41 to the wheelchair bottom bracket 31. To release the swing arm 41, such as when the user would like to collapse or store the wheelchair, the user may simply press the handle arm 53 end of the keeper arm 52, which causes the keeper arm 52 to rotate about the pivot aperture 54 and release the keeper post 101.

The swing arm 41, swing arm clamp 11, vertical adjustment post 61, angle adjustment means 61 and amputee support pad can be easily removed from the wheelchair as described above by moving the keeper arm 52 such that the swing arm 41 can be rotated. The swing arm 41 can then be lifted off the wheelchair bottom bracket 31.

The vertical adjustment post 61 provides an attachment point for the angle adjustment means 71. The angle adjustment means 71 generally comprises a first geared face having a protruding cylindrical end, the cylindrical end fitting within the vertical adjustment post and being secured by a fastener (not shown). The angle adjustment means 71 further comprises a second geared face secured to the first geared face by a quick release mechanism and having a cylindrical end, the end fitting within the cylindrical wall of the amputee pad support 81 and being secured with a fastener (not shown). Any of a large variety of shapes and sizes of amputee pads (not shown) can be fitted to the amputee pad support 81 as may be required.

In the claimed invention, two halves of the angle adjustment means 71 separate slightly when the quick release toggle is relaxed. This allows the angle of the amputee pad to be adjusted without having to transfer the user from the wheelchair. This adjustability of the amputee pad is crucial, in particular for newly amputated users because the pad can be angled upwardly, helping to prevent edema. The amputee pad can also be rotated down for comfort after the wounds have begun to heal.

Although I have very specifically described the preferred embodiments of the invention herein, it is to be understood that changes can be made to the improvements disclosed without departing from the scope of the invention. Therefore, it is to be understood that the scope of the invention is not to be overly limited by the specification and the drawings, but is to be determined by the broadest possible interpretation of the claims.

I claim:

1. An apparatus for mounting an amputee support pad to a wheelchair comprising:

a bottom bracket having a first end for attachment to a wheelchair and a second end comprising a raised swing away post;

a keeper post attached to the bottom bracket between the first end and the second end;

a swing away bracket comprising a first end and a second end, the second end of the swing away bracket having an aperture to accommodate the swing away post, the swing away bracket being mounted on the swing away post, the swing away bracket further comprising a keeper arm being attached to the swing away bracket, the keeper arm having a spring bias towards a first position in secured contact with the keeper post and being operable to a second position wherein the swing away bracket can be rotated away from the keeper post;

a vertical adjustment post attached to the swing away bracket;

an angle adjustment means having a first portion attached to the vertical adjustment post and a second portion set at an angle to the first portion;

an amputee pad support attached to the second portion of the angle adjustment means wherein the vertical adjustment post is adjustable to raise and lower the angle adjustment means and the amputee pad support; and wherein the angle adjustment means is adjustable to change the angle of the amputee support pad.

2. The apparatus of claim 1 wherein the bottom bracket further comprises a hangar slot between the first end of the bottom bracket and the second end of the bottom bracket.

3. The apparatus of claim 1 wherein the first portion of the angle adjustment means further comprises a first geared face, the geared face having a first protruding cylindrical end, and the second portion of the angle adjustment means comprises a second geared face secured to the first geared face by a quick release mechanism and having a second cylindrical end.

4. The apparatus of claim 3 wherein the first cylindrical end comprises a protrusion that fits within the vertical adjustment post and is secured by a fastener and the second cylindrical end comprises a protrusion that fits within the amputee pad support and is secured by a fastener.

5. An apparatus for mounting an amputee support pad to a wheelchair comprising:

a bottom bracket having a first end for attachment to a wheelchair by a cane clamp, a second end comprising a raised swing away post and a keeper post situated generally between the first end of the bottom bracket and the swing away post;

a swing arm having an aperture accommodating the swing away post on the bottom bracket, the swing arm being permitted to rotate about the swing away post and a keeper mechanism comprising a keeper arm being attached to the swing arm, the keeper arm having a spring bias towards a first position in contact with the keeper post and being operable to a second position wherein the swing arm can be rotated away from the keeper post, the keeper mechanism being operable to secure the swing arm to the keeper post in the first position;

a vertical adjustment post attached to the swing arm by a swing arm clamp, the swing arm clamp being operable to secure the vertical adjustment post at any height along the vertical adjustment post;

an angle adjustment means having a first portion attached to the vertical adjustment post and a second portion set at an angle to the first portion; and an amputee pad support attached to the second portion of the angle adjustment means wherein the angle adjustment means is adjustable to change the angle of the amputee support pad in the vertical plane.

6. The apparatus of claim 5 wherein the bottom bracket further comprises a hangar slot between the first end of the bottom bracket and the second end of the bottom bracket.

7. The apparatus of claim 5 wherein the first portion of the angle adjustment means further comprises a first geared face, the geared face having a first protruding cylindrical end, and the second portion of the angle adjustment means comprises a second geared face secured to the first geared face by a quick release mechanism and having a second cylindrical end.

8. The apparatus of claim 7 wherein the first cylindrical end comprises a protrusion that fits within the vertical adjustment post and is secured by a fastener and the second cylindrical end comprises a protrusion that fits within the amputee pad support and is secured by a fastener.

9. An apparatus for mounting an amputee support pad to a single point on a frame of a wheelchair comprising:

a bottom bracket having a first end for attachment to the wheelchair by a cane clamp, a second end comprising a raised swing away post and a keeper post situated generally between the first end and the swing away post and a hangar slot generally between the a keeper post and the swing away post;

a swing away bracket having an aperture accommodating the swing away post on the bottom bracket, the swing away bracket being permitted to rotate about the swing away post and comprising a keeper mechanism, the keeper mechanism being operable to secure the swing away bracket to the keeper post; the keeper mechanism comprising a keeper arm, the keeper arm being secured at a central point but permitted to rotate about the central point, and having a spring bias towards the keeper post, thereby being operable to releasably secure the swing away bracket to the keeper post;

a vertical adjustment post attached to the swing away bracket by a swing away bracket clamp, the clamp being operable to secure the vertical adjustment post at any angle;

an angle adjustment means having a first portion attached to the vertical adjustment post and a second portion set at an angle to the first portion; and an amputee pad support attached to the second portion of the angle adjustment means wherein the angle of the amputee pad support is adjustable via the angle adjustment means.

10. The apparatus of claim 9 wherein the first portion of the angle adjustment means further comprises a first geared face, the geared face having a first protruding cylindrical end, and the second portion of the angle adjustment means comprises a second geared face secured to the first geared face by a quick release mechanism and having a second cylindrical end.

11. The apparatus of claim 10 wherein the first cylindrical end comprises a protrusion that fits within the vertical adjustment post and is secured by a fastener and the second cylindrical end comprises a protrusion that fits within the amputee pad support and is secured by a fastener.

* * * * *